(12) United States Patent
MacDonald et al.

(10) Patent No.: US 10,055,637 B2
(45) Date of Patent: Aug. 21, 2018

(54) OPTICAL SENSOR WITH SUBSTRATE LIGHT FILTER

(71) Applicant: Synaptics Incorporated, San Jose, CA (US)

(72) Inventors: James MacDonald, Phoenix, AZ (US); Jason Goodelle, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 7 days.

(21) Appl. No.: 15/372,207

(22) Filed: Dec. 7, 2016

(65) Prior Publication Data

US 2018/0157889 A1   Jun. 7, 2018

(51) Int. Cl.
*G06K 9/00* (2006.01)
*H01L 27/32* (2006.01)

(52) U.S. Cl.
CPC ....... *G06K 9/0008* (2013.01); *G06K 9/00013* (2013.01); *H01L 27/3227* (2013.01)

(58) Field of Classification Search
CPC .............. G06K 9/0008; G06K 9/00013; H01L 27/3227
See application file for complete search history.

(56) References Cited

U.S. PATENT DOCUMENTS

| | | | |
|---|---|---|---|
| 5,446,290 A * | 8/1995 | Fujieda | G06K 7/14 250/227.11 |
| 5,726,443 A * | 3/1998 | Immega | G01S 17/026 250/208.1 |
| 5,907,627 A * | 5/1999 | Borza | G06K 9/0002 250/208.1 |
| 5,991,467 A | 11/1999 | Kamiko | |
| 6,128,399 A | 10/2000 | Calmel | |
| 6,856,383 B1 | 2/2005 | Vachris et al. | |
| 6,950,541 B1 * | 9/2005 | Setlak | G06K 9/0002 382/126 |
| 7,465,914 B2 | 12/2008 | Eliasson et al. | |

(Continued)

FOREIGN PATENT DOCUMENTS

| CN | 101814125 A | 8/2010 |
|---|---|---|
| CN | 101814126 B | 8/2010 |

(Continued)

OTHER PUBLICATIONS

Rowe et al. "Multispectral Fingerprint Image Acquisition" Springer, New York, USA, 2008 pp. 3-23.

(Continued)

*Primary Examiner* — John Strege
(74) *Attorney, Agent, or Firm* — Leydig, Voit & Mayer, Ltd.

(57) ABSTRACT

An optical biometric sensor is disclosed. The optical biometric sensor includes a filter layer having a top surface and a bottom surface. The filter layer includes a light filter including a blocking material forming an array of apertures; a substrate including an electrical interconnect comprising a set of electrical conductors. The biometric sensor further includes an optical sensor including an array of sensing elements mounted to the bottom surface of the substrate, wherein sensing elements in the array of sensing elements sensors are aligned with the array of apertures and electrically connected to the electrical interconnect.

19 Claims, 8 Drawing Sheets

(56) References Cited

U.S. PATENT DOCUMENTS

| | | | |
|---|---|---|---|
| 7,535,468 B2 | 5/2009 | Uy | |
| 7,620,212 B1* | 11/2009 | Allen | G06K 9/0004 340/5.53 |
| 7,697,053 B2 | 4/2010 | Kurtz et al. | |
| 7,808,540 B2 | 10/2010 | Cok | |
| 8,204,283 B2 | 6/2012 | Wu | |
| 8,204,284 B2 | 6/2012 | Wu | |
| 8,259,168 B2 | 9/2012 | Wu et al. | |
| 8,391,569 B2 | 3/2013 | Wu | |
| 8,520,912 B2 | 8/2013 | Wu et al. | |
| 8,570,303 B2 | 10/2013 | Chen | |
| 8,593,503 B2 | 11/2013 | Bolle | |
| 8,649,001 B2 | 2/2014 | Wu et al. | |
| 8,798,337 B2 | 8/2014 | Lei et al. | |
| 8,854,179 B2* | 10/2014 | Argudyaev | G06K 9/00053 340/5.52 |
| 8,903,140 B2 | 12/2014 | Wu | |
| 8,917,387 B1 | 12/2014 | Lee et al. | |
| 8,994,690 B2 | 3/2015 | Shi et al. | |
| 9,177,190 B1 | 11/2015 | Chou et al. | |
| 9,208,394 B2 | 12/2015 | Di Venuto Dayer et al. | |
| 9,582,705 B2* | 2/2017 | Du | G06K 9/00033 |
| 2004/0252867 A1 | 12/2004 | Lan et al. | |
| 2004/0263670 A1 | 12/2004 | Yamasaki | |
| 2006/0007222 A1 | 1/2006 | Uy | |
| 2008/0121442 A1 | 5/2008 | Boer et al. | |
| 2009/0141116 A1 | 6/2009 | Kanade et al. | |
| 2010/0034433 A1 | 2/2010 | Thiebot et al. | |
| 2010/0066800 A1 | 3/2010 | Ryf et al. | |
| 2010/0172552 A1 | 7/2010 | Wu | |
| 2010/0183200 A1 | 7/2010 | Wu | |
| 2010/0208952 A1 | 8/2010 | Wu | |
| 2010/0208954 A1 | 8/2010 | Wu | |
| 2010/0283756 A1 | 11/2010 | Ku et al. | |
| 2010/0310137 A1* | 12/2010 | Chou | G06K 9/00013 382/124 |
| 2011/0102308 A1 | 5/2011 | Nakamura et al. | |
| 2011/0122071 A1* | 5/2011 | Powell | G06F 3/0412 345/173 |
| 2011/0285680 A1 | 11/2011 | Nakamura | |
| 2012/0076370 A1 | 3/2012 | Lei et al. | |
| 2012/0105614 A1 | 5/2012 | Wu et al. | |
| 2012/0113160 A1 | 5/2012 | Kurokawa | |
| 2012/0162490 A1 | 6/2012 | Chung | |
| 2012/0167170 A1 | 6/2012 | Shi et al. | |
| 2012/0321149 A1 | 12/2012 | Carver et al. | |
| 2012/0328170 A1 | 12/2012 | Wu et al. | |
| 2013/0034274 A1 | 2/2013 | Wu et al. | |
| 2013/0051635 A1 | 2/2013 | Wu et al. | |
| 2013/0119237 A1 | 5/2013 | Raguin et al. | |
| 2013/0135268 A1 | 5/2013 | Kanade et al. | |
| 2013/0135328 A1 | 5/2013 | Rappoport et al. | |
| 2013/0169780 A1 | 7/2013 | Wu | |
| 2013/0222282 A1 | 8/2013 | Huang et al. | |
| 2013/0287272 A1 | 10/2013 | Lu et al. | |
| 2013/0287274 A1 | 10/2013 | Shi et al. | |
| 2013/0293459 A1 | 11/2013 | Nakamura et al. | |
| 2014/0016071 A1 | 1/2014 | Yang et al. | |
| 2014/0036168 A1* | 2/2014 | Ludwig | G06F 3/0412 349/12 |
| 2014/0037257 A1 | 2/2014 | Yang et al. | |
| 2014/0092028 A1 | 4/2014 | Prest et al. | |
| 2014/0092346 A1 | 4/2014 | Yang et al. | |
| 2014/0103943 A1 | 4/2014 | Dunlap et al. | |
| 2014/0125788 A1 | 5/2014 | Wu | |
| 2014/0129843 A1 | 5/2014 | Shi et al. | |
| 2014/0218327 A1* | 8/2014 | Shi | G06F 3/041 345/174 |
| 2014/0292666 A1 | 10/2014 | Shi et al. | |
| 2015/0062088 A1 | 3/2015 | Cho et al. | |
| 2015/0078633 A1 | 3/2015 | Hung | |
| 2015/0109214 A1 | 4/2015 | Shi et al. | |
| 2015/0154436 A1 | 6/2015 | Shi et al. | |
| 2015/0331508 A1 | 11/2015 | Nho et al. | |
| 2015/0347812 A1 | 12/2015 | Lin | |
| 2015/0347813 A1 | 12/2015 | Tsen | |
| 2015/0369661 A1 | 12/2015 | Lin | |
| 2015/0371074 A1 | 12/2015 | Lin | |
| 2015/0371075 A1 | 12/2015 | Lin | |
| 2015/0379323 A1 | 12/2015 | Erhart et al. | |
| 2016/0132712 A1* | 5/2016 | Yang | G06K 9/0002 348/77 |
| 2016/0224816 A1 | 8/2016 | Smith et al. | |
| 2016/0247010 A1 | 8/2016 | Huang et al. | |
| 2017/0220838 A1* | 8/2017 | He | G06K 9/001 |
| 2017/0235997 A1* | 8/2017 | Choi | G06K 9/00087 382/124 |
| 2018/0005005 A1* | 1/2018 | He | G06K 9/0002 |
| 2018/0012069 A1* | 1/2018 | Chung | G06K 9/00563 |

FOREIGN PATENT DOCUMENTS

| | | |
|---|---|---|
| CN | 102467660 A | 5/2012 |
| CN | 102682280 A | 9/2012 |
| CN | 202443032 U | 9/2012 |
| CN | 102842026 A | 12/2012 |
| CN | 202632318 U | 12/2012 |
| CN | 102915430 A | 2/2013 |
| CN | 102955936 A | 3/2013 |
| CN | 101814126 A | 4/2013 |
| CN | 102682280 B | 6/2013 |
| CN | 103198289 A | 7/2013 |
| CN | 102467660 B | 11/2013 |
| CN | 103810483 A | 5/2014 |
| CN | 103942537 A | 7/2014 |
| CN | 104035620 A | 9/2014 |
| CN | 104063704 A | 9/2014 |
| CN | 203838722 U | 9/2014 |
| CN | 104182727 A | 12/2014 |
| CN | 204028936 U | 12/2014 |
| CN | 104463074 A | 3/2015 |
| CN | 102915430 B | 8/2015 |
| CN | 102842026 B | 9/2015 |
| CN | 102955936 B | 9/2015 |
| EP | 2437201 A2 | 4/2012 |
| EP | 2437201 A3 | 4/2012 |
| EP | 2447883 A1 | 5/2012 |
| EP | 2555137 A1 | 2/2013 |
| EP | 2562683 A1 | 2/2013 |
| JP | 3177550 U | 8/2012 |
| KR | 20120003165 U | 5/2012 |
| KR | 200462271 Y1 | 9/2012 |
| KR | 20130016023 A | 2/2013 |
| KR | 20130022364 A | 3/2013 |
| KR | 101259310 B1 | 5/2013 |
| KR | 101307002 B1 | 9/2013 |
| TW | 201214303 A1 | 4/2010 |
| TW | 201027436 A1 | 7/2010 |
| TW | 201032145 A1 | 9/2010 |
| TW | 201115479 A1 | 5/2011 |
| TW | M435680 U1 | 2/2012 |
| TW | 201301144 A1 | 1/2013 |
| TW | I382349 B1 | 1/2013 |
| TW | I382350 B1 | 1/2013 |
| TW | I450201 B | 2/2013 |
| TW | 201310353 A1 | 3/2013 |
| TW | 201329872 A1 | 7/2013 |
| TW | 201419165 A | 5/2014 |
| TW | I444904 B | 7/2014 |
| TW | I448973 B | 8/2014 |
| TW | I457842 B | 10/2014 |
| TW | 201441940 A | 11/2014 |
| TW | I456510 B | 12/2014 |
| TW | 201308215 A1 | 2/2015 |
| TW | 201506807 A | 2/2015 |
| WO | WO 2015/041459 A1 | 3/2015 |
| WO | WO 2015/140600 A1 | 9/2015 |

OTHER PUBLICATIONS

VKANSEE Presentation prior to Sep. 30, 2015.
Cho, et al, "Embedded Nano-Si Optical Sensor in TFT-LCDs Technology and Integrated as Touch-Input Display" *Digest of Technical Papers*. vol. 42. No. 1., 2011, pp. 1818-1821.

(56) References Cited

OTHER PUBLICATIONS

Brown, et al., "A Continuous-Grain Silicon-System LCD With Optical Input Function" IEEE Journal of Solid-State Circuits, Dec. 12, 2007, vol. 42.
Atpina Technology White Paper "An Objective Look at FSI and BSI" May 18, 2010, 6 pages.
Durini, "High Performance Silicon Imaging: Fundamentals and Applications of CMOS and CCD Sensors" *Woodhead Publishing Series in Electronic and Optical Materials* 1st edition; May 8, 2014, pp. 98-107.
Lochner, Claire M., et al. "All-organic optoelectronic sensor for pulse oximetry." *Nature communications* 5 Article No. 5745, DOI: 10.1038/ncomms6745, Dec. 10, 2014.

\* cited by examiner

OPTICAL SENSOR WITH SUBSTRATE LIGHT FILTER

FIELD

This disclosure generally relates to optical sensors, and more particularly to an optical sensor using a light filter.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

Optical sensors provide an alternative to capacitive sensors. Unfortunately, conventional optical fingerprint sensors are too bulky to be packaged in mobile devices and other common consumer electronic devices, confining their use to door access control terminals and similar applications where sensor size is not a restriction.

SUMMARY

One embodiment provides an optical imaging device for imaging a biometric. The optical imaging device includes a filter layer having a top surface and a bottom surface. The filter layer includes a light filter including a blocking material forming an array of apertures and a substrate including an electrical interconnect comprising a set of electrical conductors. The optical imaging devices further includes an optical sensor including an array of sensing elements, the optical sensor being mounted to the bottom surface of the substrate, wherein sensing elements of the array of sensing elements are aligned with the light filter and electrically connected to the electrical interconnect.

Another embodiment provides a fingerprint sensor. The fingerprint sensor includes a filter layer comprising a substrate having a top surface and a bottom surface. The filter layer further includes a light filter formed in the substrate including a plurality of metal layers forming an array of apertures and an electrical interconnect formed in the substrate comprising a set of electrical conductors. The fingerprint sensor further includes an optical sensor including an array of photosensors, the optical sensor being mounted to the bottom surface of the substrate, wherein the photosensors are aligned with the light filter and electrically connected to the electrical interconnect.

Yet another embodiment provides a method for making an optical biometric sensor. The method includes forming a light filter substrate having a top side and bottom side, which further includes forming a first metal layer having a first array of apertures; forming a first transparent layer made of dielectric material above the first metal layer; forming a second metal layer above the first transparent layer having a second array of apertures, the second array of apertures being aligned with the first array of apertures; and forming an electrical interconnect comprising one or more electrical conductors.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Turning to the drawings, and as described in greater detail herein, embodiments provide systems and methods to optically image an input objects such as biometrics including but not limited to fingerprints. In particular, systems and methods are described for a biometric sensor having a substrate, which may be integrated with a light filter, onto which an optical sensor, such as a flip chip may be mounted. A sensor area of the flip chip die may be aligned to the light filter. The biometric sensor may be mounted under a cover layer, such as glass and/or a display.

Embodiments of the optical sensor include the integration of the filter structure into the substrate using patterning of the substrate materials. Multilayer circuit laminates may be fabricated by building up sequential layers of patterned materials including but not limited to, for example, dielectric and metal material sheets. Layers may have metallic cladding or be transparent and/or dielectric only. Subsequent selective material addition or removal, via formation, metal plating and patterning may be performed on each layer to form a multilayer laminate substrate. Such micro-patterning methods for transparent material, which may be dielectric, and/or metal may be used to create an optical filter. The optical filter is formed by an array of optically clear or transparent areas, e.g., "holes" which transmit light, in a "field" which blocks light formed by substrate patterning. The arrangement produces a filter with a diameter and pitch suitable for integrating with a sensor, such as a standard CMOS Image Sensor die (CIS).

The optical sensor die may be flip chip bonded to the substrate with a sensor area aligned to the filter holes. Side or under fill epoxy may be applied around the periphery of the flip chip die for environmental and mechanical protection.

Various methods for creating the light filter are described. One method is patterning of the substrate blocking layers (e.g., metal), using additive or subtractive methods, to form an array of open metal areas as "holes" or apertures in a field of blocking metal. Dependent upon optical transmission requirements, transparent (e.g., dielectric) may remain in the "hole" areas, or it may be removed. Removal methods may be chemical (etch) or mechanical (drill, laser, punch). Blocking material, such as metal, may be plated in "holes" where the transparent material is removed to further enhance optical isolation between adjacent holes. The embodiments may be implemented to reduce package height and complexity as well as thickness of the optical sensor.

Figure 1:
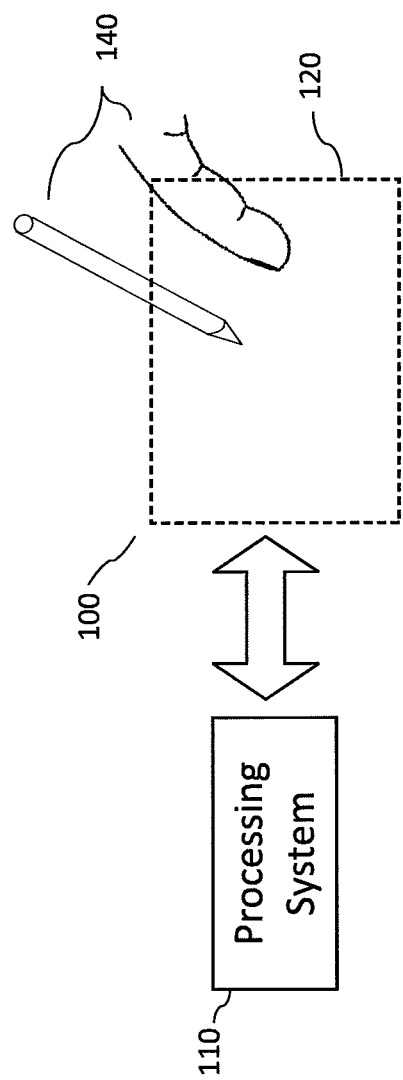
FIG. 1 is a block diagram of an example of a system that includes an optical sensor and a processing system.

FIG. 1 is a block diagram of an exemplary sensing system having a sensor 100, in accordance with embodiments of the disclosure. The sensor 100 may be configured to provide input to an electronic system (also "electronic device"). Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The sensor 100 can be implemented as a physical part of the electronic system, or can be physically separate from the electronic system. In accordance with the disclosure, the sensor 100 may be integrated as part of a display of an electronic device. As appropriate, the sensor 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

The sensor 100 is configured to sense input provided by one or more input objects 140 in a sensing region 120. In one embodiment, the input object 140 is a finger, and the sensor 100 is implemented as a fingerprint sensor (also "fingerprint scanner") configured to detect fingerprint features of the input object 140. In other embodiments, the sensor 100 may be implemented as vascular sensor (e.g., for finger vein recognition), hand geometry sensor, or a proximity sensor (such as a touch pad, touch screen, and or other touch sensor device).

Sensing region 120 encompasses any space above, around, in, and/or near the sensor 100 in which the sensor 100 is able to detect input (e.g., user input provided by one or more input objects 140). The sizes, shapes, and locations of particular sensing regions may vary widely from embodiment to embodiment. In some embodiments, the sensing region 120 extends from a surface of the sensor 100 in one or more directions into space. In various embodiments, input surfaces may be provided by surfaces of casings within which sensor elements reside, by face sheets applied over the sensor elements or any casings, etc. In some embodiments, the sensing region 120 has a rectangular shape when projected onto an input surface of the input device 100.

The sensor 100 may utilize any combination of sensor components and sensing technologies to detect user input in the sensing region 120. The sensor 100 comprises one or more detector elements (or "sensing elements") for detecting user input. Some implementations utilize arrays or other regular or irregular patterns of sensing elements to detect the input object 140.

In the optical implementations of the input device 100 set forth in this disclosure, one or more detector elements detect light from the sensing region. In various embodiments, the detected light may be reflected from input objects in the sensing region, emitted by input objects in the sensing region, or some combination thereof. Example optical detector elements include photodiodes, CMOS arrays, CCD arrays, and other types of photosensors configured to detect light in the visible or invisible spectrum (such as infrared or ultraviolet light). The photosensors may be thin film photodetectors, such as thin film transistors (TFTs) or thin film diodes.

Some optical implementations provide illumination to the sensing region. Reflections from the sensing region in the illumination wavelength(s) are detected to determine input information corresponding to the input object.

Some optical implementations rely on principles of direct illumination of the input object, which may or may not be in contact with an input surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

Some optical implementations rely on principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the input surface.

Some implementations are configured to provide images that span one, two, three, or higher dimensional spaces. The input device may have a sensor resolution that varies from embodiment to embodiment depending on factors such as the particular sensing technology involved and/or the scale of information of interest. For example, some biometric sensing implementations may be configured to detect physiological features of the input object (such as fingerprint ridge features of a finger, or blood vessel patterns of an eye), which may utilize higher sensor resolutions and present different technical considerations from some proximity sensor implementations that are configured to detect a position of the input object with respect to the sensing region (such as a touch position of a finger with respect to an input surface). In some embodiments, the sensor resolution is determined by the physical arrangement of an array of sensing elements, where smaller sensing elements and/or a smaller pitch can be used to define a higher sensor resolution.

In some embodiments, the sensor 100 is implemented as a fingerprint sensor having a sensor resolution high enough to capture features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, the fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 mm2 or less. In another exemplary embodiment, a partial placement sensor has an imaging area in the range of 20-50 mm2. In some implementations, the partial fingerprint sensor has an input surface that is the same size as the imaging area.

While the input device is generally described in the context of a fingerprint sensor in FIG. 1, embodiments include other biometric sensor devices. In various embodiments, a biometric sensor device may be configured to capture physiological biometric characteristics of a user. Some example physiological biometric characteristics include fingerprint patterns, vascular patterns (sometimes known as "vein patterns"), palm prints, and hand geometry.

In FIG. 1, a processing system 110 is shown in communication with the input device 100. The processing system 110 comprises parts of or all of one or more integrated circuits (ICs) including microprocessors, microcontrollers and the like and/or other circuitry components. In some embodiments, the processing system may be configured to operate hardware of the input device to capture input data, and/or implement a biometric process or other process based on input data captured by the sensor 100.

In some implementations, the processing system 110 is configured to operate sensor hardware of the sensor 100 to detect input in the sensing region 120. In some implementations, the processing system comprises driver circuitry configured to drive signals with sensing hardware of the input device and/or receiver circuitry configured to receive signals with the sensing hardware. For example, a processing system for an optical sensor device may comprise driver circuitry configured to drive illumination signals to one or more LEDs, an LCD backlight or other light sources, and/or receiver circuitry configured to receive signals with optical receiving elements.

In some embodiments, the processing system 110 comprises electronically-readable instructions, such as firmware code, software code, and/or the like. In some embodiments, the processing system 110 includes memory for storing electronically-readable instructions and/or other data, such as reference templates for biometric recognition. The processing system 110 can be implemented as a physical part of the sensor 100, or can be physically separate from the sensor 100. The processing system 110 may communicate with parts of the sensor 100 using buses, networks, and/or other wired or wireless interconnections. In some embodiments, components composing the processing system 110 are located together, such as near sensing element(s) of the sensor 100. In other embodiments, components of processing system 110 are physically separate with one or more components close to sensing element(s) of sensor 100, and one or more components elsewhere. For example, the sensor 100 may be a peripheral coupled to a computing device, and the processing system 110 may comprise software configured to run on a central processing unit of the computing device and one or more ICs (perhaps with associated firmware) separate from the central processing unit. As another example, the sensor 100 may be physically integrated in a mobile device, and the processing system 110 may comprise circuits and/or firmware that are part of a central processing unit or other main processor of the mobile device. In some embodiments, the processing system 110 is dedicated to implementing the sensor 100. In other embodiments, the processing system 110 performs functions associated with the sensor and also performs other functions, such as operating display screens, driving haptic actuators, running an operating system (OS) for the electronic system, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include unlocking a device or otherwise changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the sensor 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, authenticate a user, and the like.

In some embodiments, the sensing region 120 of the sensor 100 overlaps at least part of an active area of a display screen, such as embodiments where the sensor 100 comprises a touch screen interface and/or biometric sensing embodiments configured to detect biometric input data over the active display area. For example, the sensor 100 may comprise substantially transparent sensor electrodes. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display screen may also be flexible or rigid, and may be flat, curved, or have other geometries. In some embodiments, the display screen includes a glass or plastic substrate for TFT circuitry and/or other circuitry, which may be used to provide visuals and/or provide other functionality. In some embodiments, the display device includes a cover lens (sometimes referred to as a "cover glass") disposed above display circuitry which may also provide an input surface for the input device. Example cover lens materials include plastic, optically clear amorphous solids, such as chemically hardened glass, as well as optically clear crystalline structures, such as sapphire. In accordance with the disclosure, the sensor 100 and the display screen may share physical elements. For example, some embodiments may utilize some of the same electrical components for displaying visuals and for input sensing. In one embodiment, one or more display electrodes of a display device may configured for both display updating and input sensing. As another example, the display screen may be operated in part or in total by the processing system 110 in communication with the input device.

Figure 2:
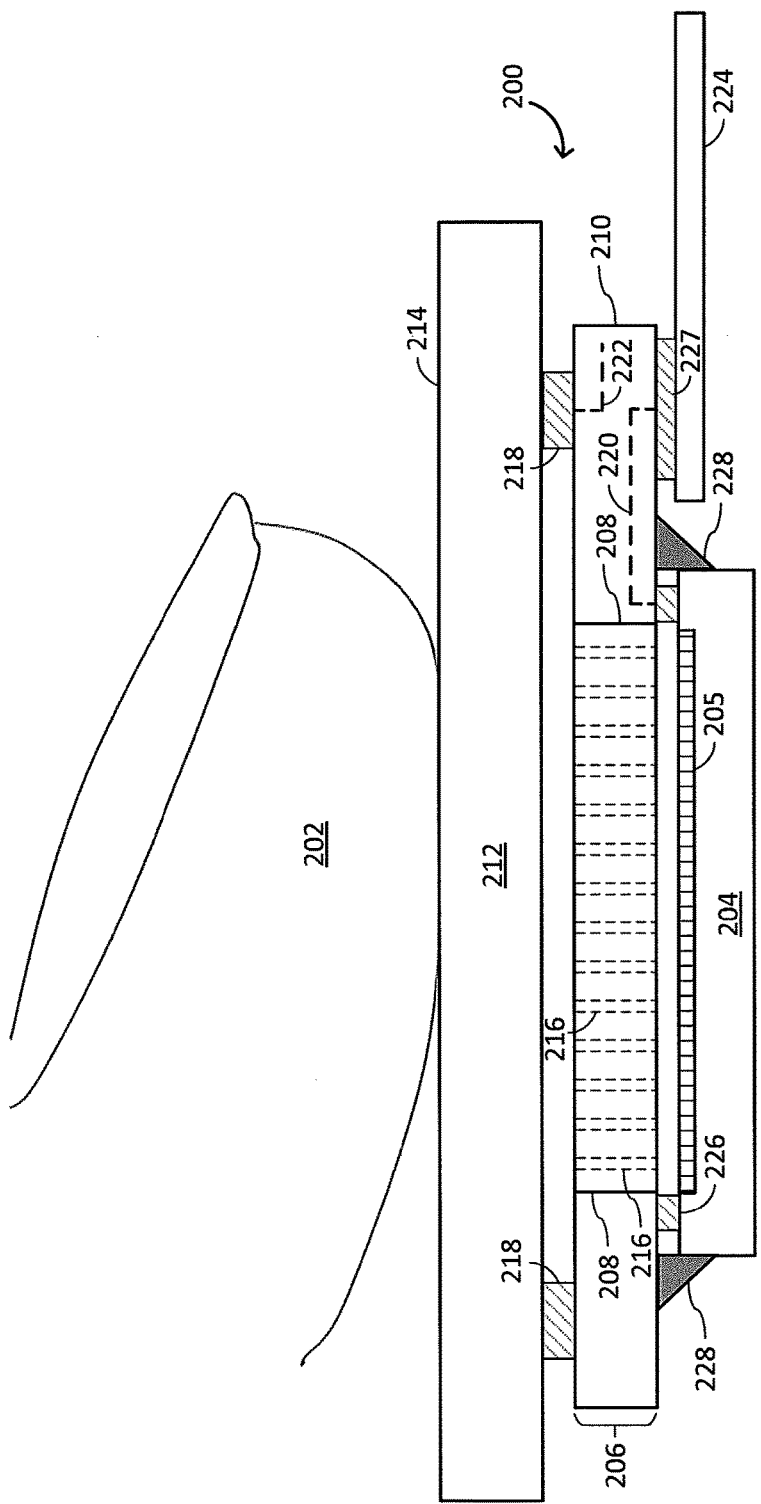
FIG. 2 illustrates an example of an optical sensor according to an embodiment.

FIG. 2 illustrates an example of an optical imaging device 200 used to image an input object 202, such as a fingerprint or other biometric. The optical imaging device 200 includes an optical sensor 204 and a filter layer 206 having a top surface and a bottom surface. The filter layer 206 includes a light filter 208 and substrate 210. As described in more detail below, the light filter 208 may be formed in and/or as part of the substrate 210 (e.g., integral with the substrate), or may be a separable or distinct component from the substrate 210.

Also shown is cover layer 212. The cover layer 212 protects the inner components of the optical imaging device 200 such as the optical sensor 204 and the filter layer 206. The cover layer 212 may include a cover glass or cover lens. In certain embodiments, the cover layer 212 includes a display stack, such as an OLED display. Thus, the optical imaging device 200 may be used to image an input object 202 over any part of an overall display, over designed portions of the display, or over a cover lens or glass without a display.

A sensing region for the input object 202 is defined above the cover layer 212. The sensing region includes sensing surface 214 formed by a top surface of the cover layer 212, which provides a contact area for the input object 202 (e.g., fingerprint or more generally biometric). As previously described above, the sensing region may extend above the sensing surface 214. Thus, the input object 202 need not contact the sensing surface 214 to be imaged.

Although generally described in the context of fingerprint for illustrative purposes, the input object 202 is any object to be imaged. Generally, the input object 202 will have various features. For example, in the case of a fingerprint, the input object 202 has ridges and valleys which may be optically imaged. Illumination of the input object 202 for imaging may be provided by display components, e.g., OLEDs and/or by a separate light source (not shown) which may be mounted under or above the filter layer 206. When the light source is mounted below the filter layer 206, portions of the filter layer 206 may be transparent to allow light to reach cover layer 212 and sensing surface 214.

The optical imaging device 200 includes light filter 208 within the filter layer 206 for conditioning of light reflected from the input object 202 and/or at the sensing surface 214. The light filter 208 includes an array of apertures, or holes, 216 with each aperture 216 being generally above one or more optical sensing elements of the optical sensor 204 such that light passing through the apertures 216 reach the sensing elements. The array of apertures 216 may form a regular or irregular pattern. The apertures 216 may be voids or may be made of transparent material, or a combination thereof, and may be formed using additive or subtractive methods (e.g., laser, drilling, etching, punch and the like). In areas other than apertures 216, the light filter 208 includes material (e.g., metal) that will block, reflect, absorb or otherwise occlude light from passing therethrough. Thus, the light filter 208 generally only permits light rays reflected from the input object 202 (e.g., finger) or sensing surface 214 at normal or near normal incidence (relative to a longitudinal plane defined by the filter layer 206) to pass and reach the optical sensing elements of the optical sensor 204. Examples of the structure of the light filter are described further in connection with FIGS. 5A-5D.

The filter layer 206 is attached to the cover layer 212 via interconnects 218. Interconnects 218 are any suitable mechanism to mechanically attach the filter layer 206 to the cover layer 212. In certain embodiments, the interconnects 218 may further provide for electrical connection 222 between the cover layer 212 and the substrate 210 to transmit, for example, signals and/or power between the cover layer 212 and other system components. Such electrical connection may be used, for example, where the cover layer 212 is a display.

The substrate 210 also includes electrical interconnect 220. The electrical interconnect 220 carries signals (e.g., power, data, etc.) between the optical sensor 204 and sensor circuit 224. As noted, the substrate 210 may also include electrical interconnect 222 to carry signals between the cover layer 212 and sensor circuit 224 and/or other system components. The electrical interconnect 220 and/or 222 may be constructed using any suitable means including, by way of example, traces or metalized layers or other conductors within the substrate 210. The electrical interconnects 220 and 222 may be formed within a single layer or may comprise multiple layers, which may be further interconnected with vias or other suitable means. As described below, metalized layers used for electrical interconnect 220 and/or 222 may also be used to form the blocking material and apertures 216 of the light filter 208. Conductors of the electrical interconnect 220 and/or 222 may also be used to ground some or all of the blocking material.

The optical sensor 204 is disposed below the filter layer 206 and includes sensing area 205 with the sensing area generally aligned with the filter layer 216. The sensing area 205 in turn includes an optical sensor array comprising an array of optical sensing elements, with one or more sensing elements in the optical sensor array being disposed generally below an aperture 216 of the light filter 208. Optical sensing elements in the optical sensor array detect the intensity of light passing through the light filter 208, which become incident on the sensing area 205. Examples of optical sensors 204 include a CMOS image sensor which may be formed from a semiconductor die, such as a CMOS Image Sensor (CIS) Die.

The optical sensor 204 may form a flip chip, which is electrically and mechanically connected to the filter layer 206 by way of interconnects 226. In such an arrangement, the interconnects 226 may, for example, be formed by solder bumps. Additional protection may be provided by way of side fill, or under fill 228 to provide for mechanical and environmental protection.

The sensor circuit 224 may be a flex circuit, circuit board, cable etc. further carrying the signals to circuitry for controlling and processing the data received from the optical sensor array in the sensing area 205. The circuitry for controlling and processing the data may also be disposed in whole or in part of the sensor circuit 224. The sensor circuit 224 may be connected to the substrate 210 using interconnect 227, which may be any suitable means for mechanical and electrical connection including conductive adhesive, solder etc.

To achieve optical sensing of features such as fingerprints and fingerprint-sized features through cover layer 212, light reflected from the input object 202 and/or sensing surface 214 is conditioned by the light filter 208 so that the light reaching a sensing element in the sensing area 205 comes only from a small spot on the input object 202 and/or sensing surface 214, generally above the sensor element. In the absence of such conditioning, any light arriving at a sensing element from a region on the input object 202 far away from the optical sensing elements contributes to image blurring. The light filter 208 provides such light conditioning for the optical imaging device 200 by only allowing light traversing the apertures 216 to reach the sensing area 205 and, thus, to reach the optical sensor elements.

It will be appreciated that the filter layer 206 acts as both the light conditioner and substrate for mounting the optical sensor 204. Moreover, the substrate 210 can carry the signals between the optical sensor 204 and sensor circuit 224. The optical imaging device thus provides a compact and low cost design.

Figure 3:
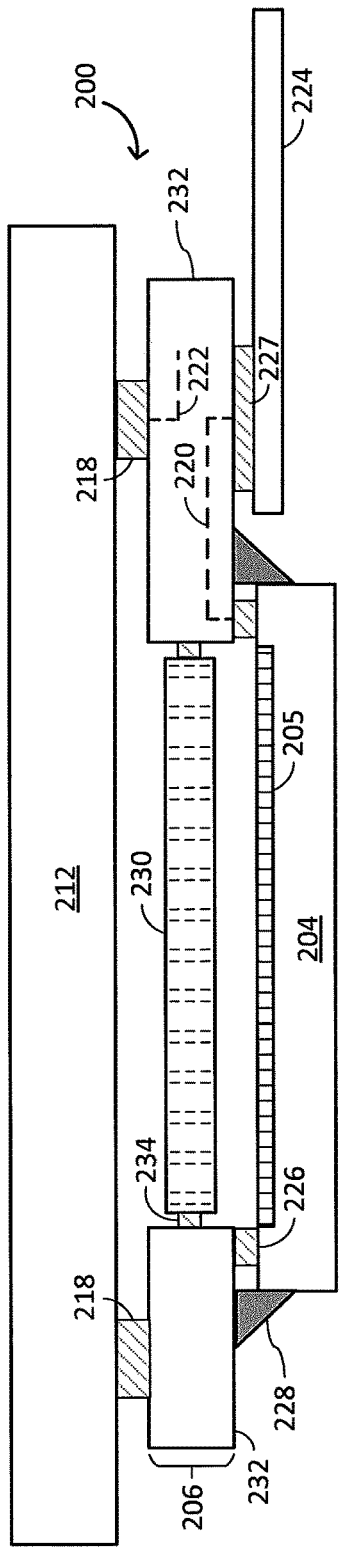
FIG. 3 illustrates an example of an optical sensor according to another embodiment.

FIG. 3 illustrates an alternative embodiment of the optical imaging device 200 of FIG. 2 with like reference numerals referencing like components.

Like FIG. 2, the embodiment of FIG. 3 includes a light filter, labeled 230, and a substrate, labeled 232. In FIG. 3, the light filter 230 is formed as separate component from the substrate 232. The substrate 232 forms a void in which the light filter 230 is generally disposed. The light filter 230 is attached to the substrate 232 via interconnects 234, which mechanically connect the light filter 230 to the substrate 232. Interconnects 234 may also form an electrical connection where needed, for example, if grounding of the light filter 230, or portions thereof, is desired. The design of FIG. 3 allows the light filter 230 to be made from the same or different materials as compared to the substrate 232 and further allows the height of the light filter 230 to be the same or different as compared to the substrate 232. The light filter 230 may be pre-attached to the substrate 232, e.g., attached before affixing the optical sensor 204 to the optical imaging device 200.

Figure 4:
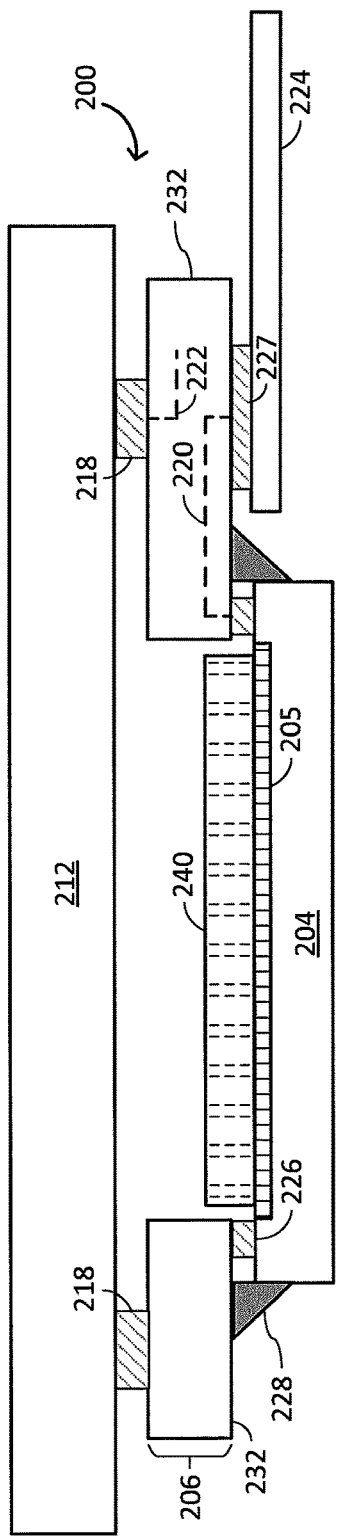
FIG. 4 illustrates an example of an optical sensor according to another embodiment.

FIG. 4 illustrates an alternative embodiment of the optical imaging device 200 of FIG. 2 and FIG. 3 with like reference numerals referencing like components.

Similar to FIG. 3, separable or distinct light filter 240 and substrate 232 are provided. However, as shown, the light filter 240 is positioned directly onto the optical sensor 204 above the sensing area 205. Thus, the light filter 240 can optionally be mounted to or built up on the optical sensor 204 and aligned to the sensor elements before the optical sensor is attached to substrate 232.

FIGS. 5A-5D illustrate various examples of light filter substrates or structures and methods for making them. The light filter structures and methods may be used to provide a light filter integrated with the substrate material (FIG. 2) or a discrete light filter (FIGS. 3 and 4) which may be connected to the substrate material and/or optical sensor. As will be appreciated, the light filter structures may be made using additive or subtractive methods for patterning materials such as silicon, glass, polymer, metal or composite materials.

Figure 5A:
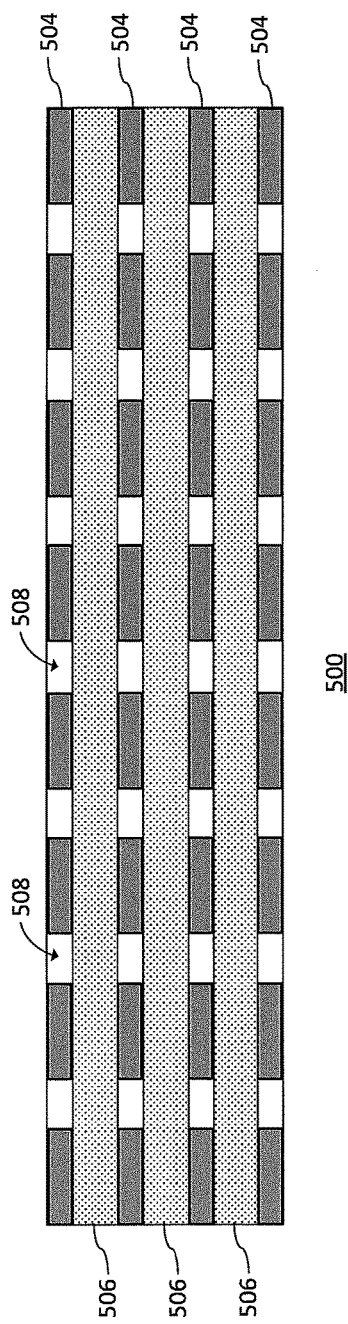
FIG. 5A-5D illustrate examples of various light filter structures.

FIG. 5A illustrates an example of a light filter 500. It will be understand that the structure of the light filter 500 is by way of example. Other configurations may be used to restrict the light passing through the light filter 500 such that light rays normal or near normal relative to the orientation shown pass through the light filter while light rays having a relatively large angle from normal are blocked. Other non-limiting examples of configuration of the light filter are shown and described in connection with FIGS. 5B-5D.

The light filter 500 includes alternating layers of a blocking material 504 and transparent material 506. The blocking material 504 may be metal (e.g., copper), ceramic, or other opaque material. Metal blocking material may be coated to facilitate the blocking or absorption of light, e.g., coated with dark oxide. The transparent material 506 may be organic or inorganic and may be a dielectric material, such as ABF, glass, epoxies, plasticizers, spherical fillers and the like. It will be noted that the use of metal and dielectric materials is by way of example. Such materials are advantageous, for example, when the light filter 500 is to be constructed of the same materials used to construct a substrate carrying electrical signals (FIG. 2) to simplify manufacture. The coefficient of thermal expansion of the materials selected for the blocking material 504 and transparent material 506 may be chosen such that the materials will stay flat during manufacture and in use.

The transparent material 506 forms a series of transparent layers, each transparent layer being formed on top of a layer formed by the blocking material 504. In the example shown, the transparent layers in FIG. 5A are generally a continuous layer of transparent material.

The blocking material 504 also forms a series of blocking layers. The blocking material 504 in each layer defines apertures 508. The apertures 508 may be formed by selectively adding the blocking material 504, or by adding a continuous layer of blocking material and then later removing blocking material 504 in the area of the desired apertures through a process such as etching, laser drilling or any other suitable technique. The apertures 508 may be left as a void or filled with transparent material, which may be the same or different from the material used to form the transparent layers 506. As previously noted, the apertures 508 form an array of apertures, which may have a regular or irregular pattern.

Figure 5B:
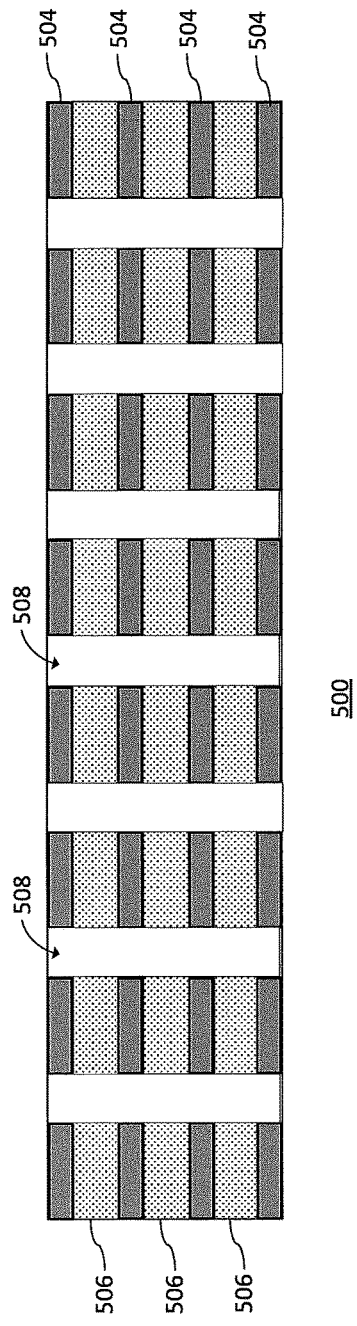

FIG. 5B illustrates an alternative embodiment of a light filter 500. In the embodiment of FIG. 5B, the transparent material 506 which is in alignment with the apertures 508 is removed as shown. The light filter 500 of FIG. 5B can be made by forming alternating continuous layers of blocking material 504 and transparent material 506 until the desired number of layers are obtained. The apertures 508 may be formed by drilling, etching, or otherwise removing material through the various layers either as each layer is formed or by removing the material in the areas of desired apertures 508 after all layers are formed. Alternatively, each layer may be made by selectively depositing the blocking material 504 and the transparent material 506 to form apertures 508.

Figure 5C:
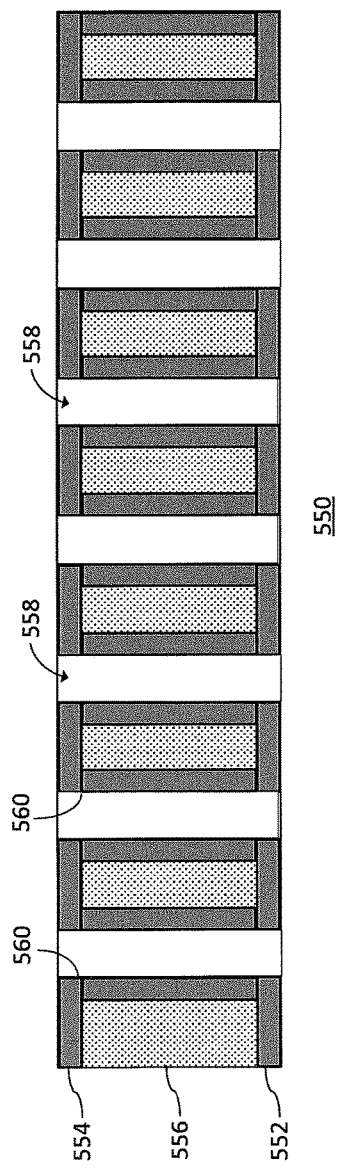

FIG. 5C illustrates an alternative embodiment of a light filter 550. The light filter 550 includes a bottom blocking layer 552, and a top blocking layer 554. A transparent layer comprising transparent material 556 is interposed between the bottom blocking layer 552 and the top blocking layer 554. Apertures 558 are formed by openings through the bottom blocking layer 552, the top blocking layer 554 and the transparent material 556. As also shown, interior sidewalls 560 within aperture 558 may be formed by optionally coating or metalizing the sidewalls with the aperture 558 to facilitate blocking of light rays that have a relatively large angle from normal.

The light filter 550 may be formed by forming the bottom blocking layer 552, forming the transparent layer 556 and then forming the top blocking layer 554. The apertures 558 may be formed by selectively depositing material at each layer (blocking layers 552, 554 and transparent layer 556), or by forming continuation layers (blocking layers 552, 554 and transparent layer 556) and then removing material in the area of the apertures 558, e.g., by etching, drilling and the like. After the apertures are formed, the interior walls 560 may be coated or metalized.

Figure 5D:
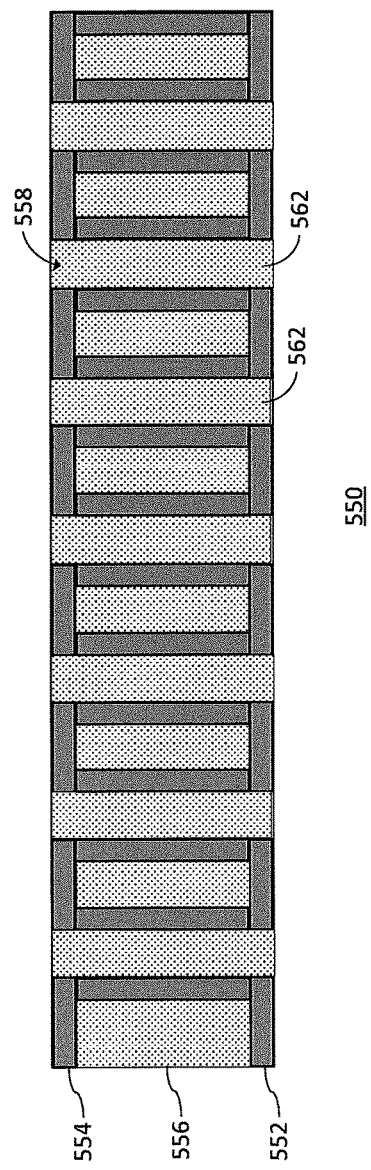

FIG. 5D illustrates an alternative light filter 550. The light filter 550 of FIG. 5D is similar to FIG. 5C, except that the apertures 558 are filled (e.g., refilled) with a transparent material 562. The transparent material 562 may be the same as the transparent material 556 or may be a different material.

The number and pitch of the apertures (e.g., 508, 558) in the filter layers described in the various embodiments will depend on the particular imaging resolution of the input object desired and will depend on other factors such as the type of optical sensor and distance of the filter layer from the input object to be imaged. By way of example, the size of the apertures may be on the order of 12 microns±2 microns, the pitch of the apertures may be on the order of 48 microns and the thickness of the light filter may be on the order of 140 to 160 microns. An example of the aspect ratio of the thickness of the light filter to width of the apertures is on the order of greater than 10:1. It will be appreciated that the width of the apertures at each blocking layer need not be the same. For example, the openings on the top layer may have a larger diameter than the openings on the bottom layers or vice versa. Additionally, the thickness of the transparent layers may be varied from layer to layer. Varying the thickness of the transparent layers and/or aperture widths may be used, for example, to maximize transmitted energy of light passing through the light filter, while minimizing spatial noise. Such methods may also be used to optimize Gaussian distribution of power through the apertures.

The formation of layers of blocking material (e.g., 504, 552, 554) may also be used to provide electrical conductors (e.g., traces), such as when an electrical interconnect (e.g., 220, 222 FIG. 2) will be included with a substrate layer integrated with the light filter. In such cases, one or more of the electrical conductors may be electrically connected to one or more of the blocking layers to provide for grounding.

Figure 6:
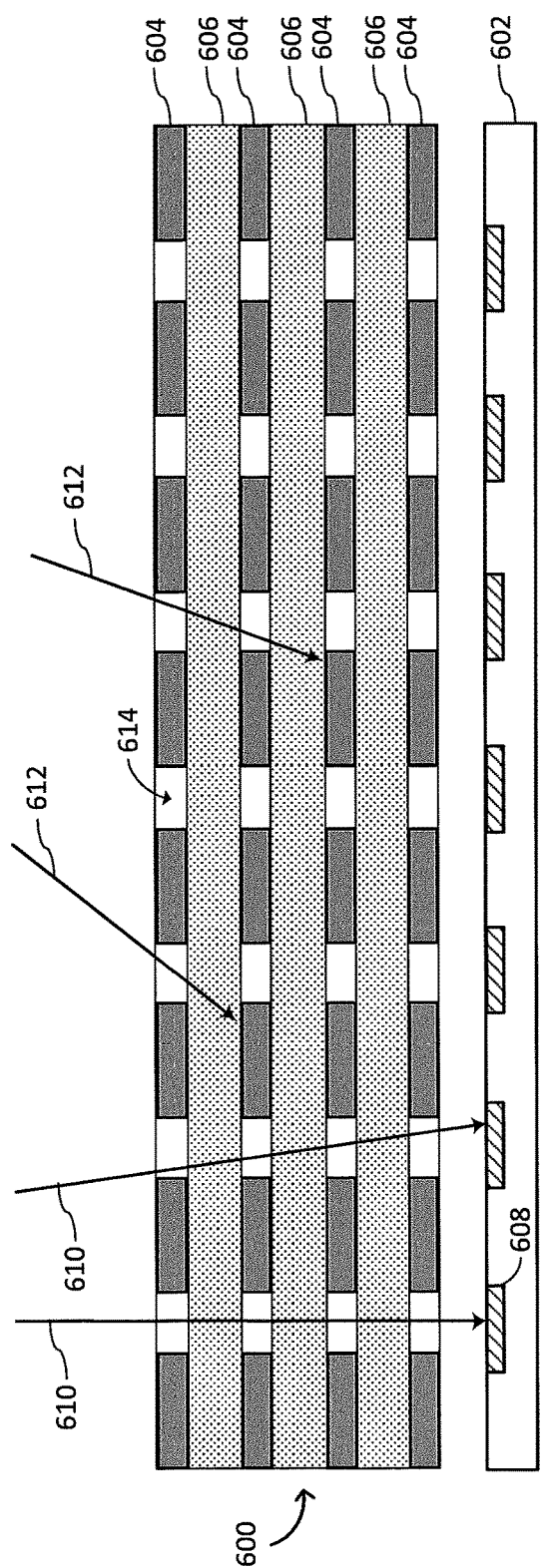
FIG. 6 illustrates an example of light interacting with a light filter according to an embodiment.

FIG. 6 illustrates examples of light rays interacting with a light filter 600. The particular structure shown is similar to the light filter of FIG. 5A; however, it will be understood that the example applies to the structures shown in FIGS. 5B-5D as well as other light filter structures which fall within the scope of the present disclosure.

In use, the light filter 600 restricts the light which reaches a sensing area 602 of an optical sensor. As shown, light rays 610 which originate from generally above the apertures 614 and which are normal or near normal (relative to the plane defined by the sensing area 602) pass through the light filter 600 and reach one or more of the optical sensing elements 608 in the sensing area 602. Lights rays 612, which are either not from generally above an aperture 614 and/or which are relatively far from normal to the plane defined by the sensing area 602 are blocked (e.g., absorbed or reflected) by the blocking material 604. In this manner, and as previously described, the light filter 600 provides light conditioning by restricting the light reaching each sensing element to light coming from only a small spot of the input object (not shown) thereby allowing imaging of small features (e.g., ridges and valleys) while minimizing blurring.

It will be appreciated that the light filters described in connection with FIGS. 5B-5D condition light (e.g., permit or block light rays) in a manner similar to that shown and described in connection with FIG. 5A.

Figure 7:
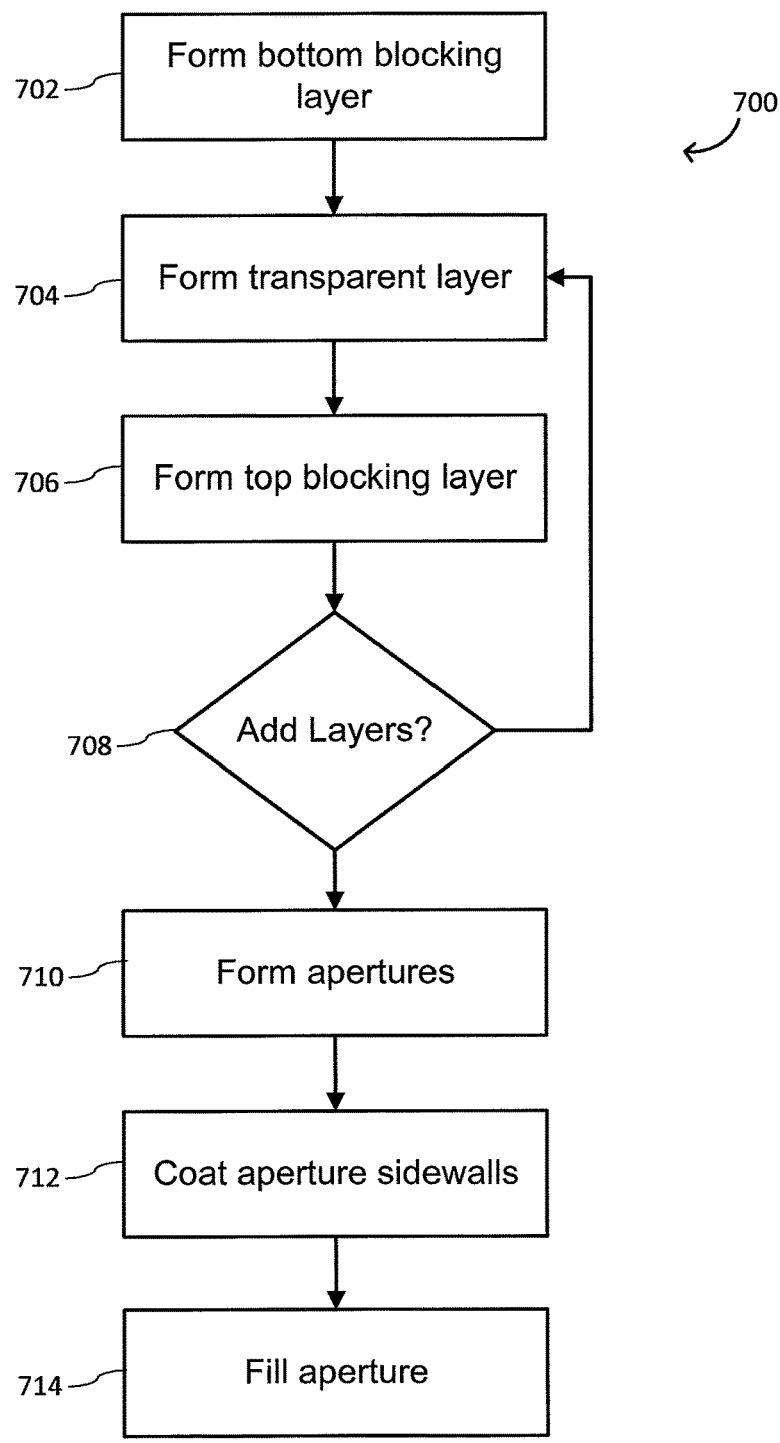
FIG. 7 illustrates an example of a process or method of making a light filter which may be integrated in, or connected to, a substrate.

FIG. 7 illustrates a method 700 for making a light filter, such as the light filters described in connection with FIGS. 5A-5D. The light filter may be integral with, or distinct from, a substrate. It will be understood that the sequence of steps is by way of example only. The steps may be performed in any order and steps may be eliminated except where otherwise apparent.

In step 702, a bottom blocking layer is formed. The bottom blocking layer may be formed as a continuous layer of metal or other blocking material, or by selectively adding the blocking material to leave voids for apertures. The blocking material may be further coated with, for example, a dark oxide or other suitable material to increase light absorbing capability.

In step 704, a transparent layer is formed. The transparent layer is made from transparent material and in certain embodiments may be a dielectric material. As with the bottom blocking layer, the transparent layer may be formed as a continuous layer or may include voids in areas where apertures are desired.

In step 706, a top blocking layer is formed. Typically, the top blocking layer will be constructed and formed in a similar fashion as described for the bottom blocking layer (step 702).

As shown in step 708, formation of the layers may be finished depending upon the number of layers desired. For example, FIGS. 5C-5D generally show one bottom blocking layer, one top blocking layer and an intervening transparent layer. In other instances, such as shown in FIGS. 5A-5B, additional layers may be desired in which case the process returns to step 704 until the desired number of layers are achieved.

In step 710, the apertures are formed if, for example, the apertures were not formed as part of the above described layer formation processes. The apertures may be formed by drilling, etching, laser or any other suitable means.

In step 712, walls of the aperture may be coated, e.g., metalized. Such coating or metallization may be provided to facilitate blocking of light rays which enter the aperture, but which nonetheless have a angle relatively far from normal.

In step 714, the apertures may optionally be refilled with a transparent material. Transparent material used to fill the apertures may, but need not be, the same as the transparent material used to form the transparent layer(s).

During formation of one or more of the blocking layers (steps 702 and/or 704), it may be desired to also form electrical conductors, for example, in the form of traces or other conductors to provide for the carrying signals from an optical sensor (e.g., 204, FIG. 2) to a sensor circuit (224) or to provide for the carrying of signals from a display to other system components. In combination therewith, or separately, it may also be desirable to form traces or other conductors to provide for grounding of one or more of the blocking layer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optical imaging device for imaging a biometric, comprising:
a filter layer having a top surface and a bottom surface, the filter layer comprising:
a light filter including a blocking material forming an array of apertures;
a substrate including an electrical interconnect comprising a set of electrical conductors; and
an optical sensor including an array of sensing elements, the optical sensor being mounted to the bottom surface of the filter layer, wherein sensing elements of the array of sensing elements are aligned with the light filter and electrically connected to the electrical interconnect,
wherein the light filter further comprises:
a first blocking layer having a first array of openings defining a bottom of the array of apertures;
a second blocking layer having a second array of openings defining a top of the array of apertures; and
a transparent material disposed between the first blocking layer and the second blocking layer, and wherein the first array of openings and the second array of openings have different diameters.

2. The optical imaging device of claim 1, wherein the first blocking layer and the second blocking layer comprise metal, and wherein the transparent material comprises a dielectric material.

3. The optical imaging device of claim 1, wherein the transparent material comprises an array of voids aligned with the first array of openings and the second array of openings, and wherein sidewalls of the voids are coated with a light absorbing material.

4. The optical imaging device of claim 1, wherein the light filter is integral with the substrate.

5. The optical imaging device of claim 1, wherein the substrate forms a void, wherein the light filter is attached to the substrate and at least partially disposed in the void.

6. The optical imaging device of claim 1, wherein the substrate forms a void, wherein the light filter is attached to the optical sensor and at least partially disposed in the void.

7. The optical imaging device of claim 1, wherein the array of sensing elements is formed in a semiconductor die.

8. The optical imaging device of claim 7, wherein the semiconductor die is a flip chip.

9. The optical imaging device claim 1, further comprising a cover layer disposed above the filter layer.

10. The optical imaging device of claim 9, wherein the cover layer includes an organic light emitting diode (OLED) display.

11. A fingerprint sensor, comprising:
a filter layer comprising a substrate having a top surface and a bottom surface, the filter layer comprising:
a light filter formed in the substrate including a plurality of metal layers forming an array of apertures;
an electrical interconnect formed in the substrate comprising a set of electrical conductors; and
an optical sensor including an array of photosensors, the optical sensor being mounted to the bottom surface of the filter layer, wherein the array of photosensors are aligned with the light filter and electrically connected to the electrical interconnect,
wherein the light filter further comprises:
a first metal layer having a first array of openings defining a bottom of the array of apertures;
a second metal layer having a second array of openings defining a top of the array of apertures; and
a transparent material disposed between the first metal layer and the second metal layer, and wherein the first array of openings and the second array of openings have different diameters.

12. The fingerprint sensor of claim 11, wherein the optical sensor is a flip chip bonded to the bottom surface of the substrate.

13. The fingerprint sensor of claim 11, further comprising a cover layer above the filter layer including an organic light emitting diode (OLED) display.

14. The fingerprint sensor of claim 11, wherein the transparent material comprises an array of voids aligned with the first array of openings and the second array of openings, and wherein sidewalls of the voids are coated with a blocking material.

15. A method for making an optical biometric sensor, comprising:
forming a light filter substrate having a top side and bottom side, comprising:
forming a first metal layer having a first array of apertures;
forming a first transparent layer made of dielectric material above the first metal layer;
forming a second metal layer above the first transparent layer having a second array of apertures, the second array of apertures being aligned with the first array of apertures and the first array of apertures and the second array of apertures having different diameters;
forming an electrical interconnect comprising one or more electrical conductors; and
attaching an optical sensor to the bottom side of the light filter substrate, the optical sensor comprising an array of sensor elements, the array of sensor elements being aligned with the first array of apertures and second array of apertures, wherein the optical sensor is electrically connected to the electrical interconnect.

16. The method of claim 15, further comprising:
removing the dielectric material between the first and second array of apertures.

17. The method of claim 16, further comprising:
forming metal sidewalls between the first and second array of apertures.

18. The method of claim 15, wherein forming the substrate further comprising:
forming a second transparent layer made of the dielectric material above the second metal layer; and
forming a third metal layer above the second transparent layer having a third array of apertures, the third array of apertures being aligned with the first and second array of apertures.

19. The method of claim 15, wherein the one or more of the electrical conductors are electrically connected to the first or second metal layer.

* * * * *